United States Patent [19]

Ashelin et al.

[11] Patent Number: 5,154,827
[45] Date of Patent: Oct. 13, 1992

[54] LAMINATED MICROPOROUS FLUOROCARBON MEMBRANE AND FLUOROCARBON FILTER CARTRIDGE USING SAME

[75] Inventors: Charles J. Ashelin, Lebanon; Dwight J. Thomas, Zionsville, both of Ind.

[73] Assignee: Parker-Nannifin Corporation, Cleveland, Ohio

[21] Appl. No.: 468,431

[22] Filed: Jan. 22, 1990

[51] Int. Cl.⁵ .................... B01D 53/22; B01D 71/30
[52] U.S. Cl. .................... 210/490; 55/158; 210/484; 210/493.2; 210/493.5; 210/500.42
[58] Field of Search ............ 210/484, 488, 490, 493.1, 210/493.2, 493.5, 500.27, 500.42; 55/16, 158

[56] References Cited

U.S. PATENT DOCUMENTS

| | | | |
|---|---|---|---|
| 3,348,695 | 10/1967 | Rosaen | 210/493.5 X |
| 3,407,252 | 10/1968 | Pall et al. | 210/493.5 X |
| 3,867,294 | 2/1975 | Pall et al. | 210/493.5 X |
| 4,588,464 | 5/1986 | Miyagi et al. | 210/493.2 X |
| 4,727,705 | 3/1988 | Zahka | 210/493.5 X |
| 4,863,602 | 9/1989 | Johnson | 210/493.5 X |
| 4,878,930 | 11/1989 | Manniso et al. | 210/493.5 X |
| 4,906,371 | 3/1990 | Miller | 210/493.5 X |
| 4,913,817 | 4/1990 | Tsushima et al. | 210/500.27 |
| 4,929,354 | 5/1990 | Meyering et al. | 210/493.2 |

FOREIGN PATENT DOCUMENTS

| | | | |
|---|---|---|---|
| 0187358 | 7/1986 | European Pat. Off. | 210/500.27 |
| 0253047 | 1/1988 | European Pat. Off. | 210/500.42 |
| 55-129107 | 10/1980 | Japan | 210/500.27 |
| 60-061018 | 4/1985 | Japan | 210/500.27 |
| 61-149220 | 7/1986 | Japan | 210/493.1 |
| 61-293830 | 12/1986 | Japan | 210/500.42 |
| 62-027019 | 2/1987 | Japan | 210/493.2 |

Primary Examiner—Robert Spitzer

[57] ABSTRACT

Novel laminated, polyfluorocarbon microporous membranes are made up of three or more sheets of aggregated microporous fluorocarbon polymer. A fine porosity pore-containing microporous fluorocarbon polymer sheet has an average pore diameter of from about 0.01μm to about 1.0μm. This fine porosity sheet is laminated between a first sheet or sheets of larger porosity microporous fluorocarbon polymer and a second sheet or sheets of larger porosity microporous fluorocarbon polymer. At least one and preferably both of the first and second sheets has an average pore diameter of from about 1.0μm to about 10.0μm. A novel microporous polyfluorocarbon filter cartridge utilizing the membrane is also disclosed. A cartridge body formed of polyfluorocarbon has an inlet and outlet with a membrane assembly disposed in the cartridge so that fluid moving from the inlet to the outlet must pass therethrough. The membrane assembly includes a membrane of the type described above supported by a polyfluorocarbon mesh support secured in the cartridge body so as to support the membrane against pressure and fluid flow through the cartridge.

10 Claims, 5 Drawing Sheets

LAMINATED MICROPOROUS FLUOROCARBON MEMBRANE AND FLUOROCARBON FILTER CARTRIDGE USING SAME

BACKGROUND OF THE INVENTION

1. Field of the Invention

This invention relates in general to novel microporous fluorocarbon membranes and fluorocarbon filter cartridges using such membrane. More particularly, this invention relates to such novel membranes and cartridges used for filtration of particles sized from about .0.001μm to about 1.0μm. Removal of contaminants of these sizes using membranes and cartridges formed from fluorocarbons are often required in the electronics and pharmaceutical industries.

2. Description of the Prior Art

In the art of membrane filtration, it is well known that filter membranes can be categorized by the particle size of the contaminants which the filter devices are suited for removing. Of course, filter membranes suitable for removing smaller particles are more difficult to construct than those suitable for removing larger particles. In order to be suitable for removing a smaller size particle, a filter membrane must have pores which are slightly smaller than the particle to be removed and essentially no pores larger than the particle to be removed. The pores must have this uniformed size. It is also necessary to have a sufficiently large number of pores to provide a desired flux or flow rate per unit area of membrane.

As the particle pore size is reduced to achieve finer filtration, it is more and more difficult to achieve the desired uniform pore-size as well as a desired flux. This problem is accentuated when the pore size is less than 1.0μm. At this size, it is especially difficult to achieve a desired uniform pore-size without having oversized pores. Moreover, in order to have sufficient flux, it is necessary to have a very thin membrane. With pores smaller than 1.0μm, fluid friction caused by the thickness of the membrane is a substantial factor in reducing flux. Thus, not only must the membrane have a very high density of uniformly sized, very small pores, the membrane must be very thin. Of course, the thinner the membrane, the more fragile it is and the more difficult it is to prevent tearing, punctures or bursts of the membrane. A thin membrane is less able to withstand increased pressures which might otherwise be used to increase flux.

These problems are compounded when it is necessary to use a filter constructed of fluorocarbon, such as polytetrafluoroethylene. Fluorocarbon is often the only material for certain applications because it can be used at high temperatures, is chemically and physically resistant and it is chemically and physically inert. Because of these very properties it is difficult to construct a microporous (<1.0μm) fluorocarbon filter membrane and it is difficult to construct a fluorocarbon filter cartridge which uses such a membrane.

Porous fluorocarbon membranes or films, particularly ones fabricated in whole or in part from polytetrafluoroethylene, have been known for twenty five years or more. Such membranes or films are usually prepared by either of two general methods:

1. Incorporating a particulate, solid, pore forming filler removable by leaching, heating, etc. into a mass of powdered fluorocarbon polymer; shaping the resulting mixture into a preform, calendering the thus-obtained preform to reduce its thickness and form it into a self-sustaining sheet or film, with or without doubling over or cross-lapping the sheet or film between passes through the calender rolls; subjecting the calendered sheet or film to heat to dry the sheet or film and sinter the fluorocarbon polymer particles, and removing the particulate filler; see, for example, U.S. Pat. Nos. 3,281,511 to Goldsmith; 3,518,332 to Sklarchuk et al; 3,556,161 to Roberts; 3,661,645 to Strier et al; 3,773,878 to Jahnke; 3,859,402 to Bintliff et al; 3,864,124 to Breton et al; 3,890,417 to Vallance; 4,003,818 to Juillard et al; 4,196,070 to Chao et al; 4,250,002; 4,297,196 and 4,498,961 to Lazarz et al; 4,292,146 and 4,342,636 to Chang et al and 4,380,521 to Moreno et al, and British Patents Nos. 943,624 to Doulton & Co. Limited and 1,081,046 to Imperial Chemical Industries Limited.

2. Forming a porous fluorocarbon polymer membrane or film having nodes interconnected by fibrils using processes which involve, for example, stretching a preformed fluorocarbon polymer sheet, or extensively mixing and then biaxially calendering a putty-like mass containing fluorocarbon polymer; see, for example, U.S. Pat. Nos. 3,953,566 and 4,187,390 to Gore; 4,049,589 to Sakane; 4,089,758 to McAloon and 4,153,661 to Ree et al.

Commercially available porous polyfluorocarbon membranes or films made by the first of these methods, incorporation and subsequent removal of a particulate solid, are mostly useful only for coarse filtration, i.e., removal from liquids of particulate matter having average particle diameters of not less than about 1.0μm, and in general also have inadequate strength, flux and dirt holding capacity to be useful in microfiltration applications. Hence, such membranes are used as coarse filters, or as separators or diaphragms in batteries and electrolytic cells.

Although porous polyfluorocarbon membranes or films having polymer nodes interconnected by fibrils have been used for microfiltration, such membranes are not without problems, some of which are attributable to their method of preparation. The membrane can itself be a major source of contamination because of its loosely bound fibrils and nodes. Also, it is difficult to control the processes by which such membranes are typically fabricated so that pore size will be correlated consistently with performance requirements.

An improved variation of the first general method outlined above and an improved membrane are revealed in U.S. Pat. No. 4,863,604 to Lo et al. In this patent an asymmetric microporous membrane is formed using two or more self-sustaining calendered sheets or films of fluorocarbon powder mixed with a leachable pore forming filler. Each sheet has a different average pore diameter so that a gradient is formed from one surface of the composite to the other. The composite is then laminated into an integral membrane by application of heat and the filler is removed to provide an asymmetric polyfluorocarbon membrane.

It is well known that the overall thickness of a filtration membrane is critical to an optimum flux. In other words, in order for a desirable high flow rate through the filtration membrane to be achieved, the thickness of the membrane must be minimized. However, in order to maintain the strength of the membrane, it is necessary that the thickness of the membrane be increased. Prior to this invention, the asymmetric membrane of the Lo et al patent was the best solution to this problem. However, it is still desirable to provide even further advantages with respect to strength and flux.

There is thus a need for chemically and physiologically inert microporous fluorocarbon membranes whose pore structures render them particularly suitable for microfiltration applications. There is also a need for improved fluorocarbon filter cartridges suitable for microfiltration applications.

It is an object of this invention to provide novel microporous fluorocarbon membranes.

It is also an object of this invention to provide novel laminated fluorocarbon membranes useful as the filtration component of a microfiltration cartridge.

It is also an object of this invention to provide a novel microfiltration cartridge.

Another object of this invention is to provide novel microporous laminated polyfluorocarbon membranes and associated cartridge structure to form a microporous polyfluorocarbon filter cartridge with improved strength and flux for microporous filtration.

SUMMARY OF THE INVENTION

In accordance with the above objects, the present invention provides a microporous, integral, composite polyfluorocarbon membrane. This membrane is formed of three or more sheets of aggregated microporous fluorocarbon polymer. The polymer has in its unaggregated state an average individual particle diameter of not more than about $0.3\mu m$ in order to provide a sufficiently fine porosity and strength in the aggregated state. The at least three sheets of the membrane include a fine porosity pore containing microporous fluorocarbon polymer sheet having an average pore diameter of from about $0.01\mu m$ to about $1.0\mu m$. This fine porosity sheet is laminated between a first sheet or sheets of larger porosity microporous fluorocarbon polymer and a second sheet or sheets of larger porosity microporous fluorocarbon polymer. At least one of the first and second sheets has an average pore diameter of from about $1.0\mu m$ to about $10.0\mu m$.

The present invention also provides a microporous polyfluorocarbon filter cartridge. This filter cartridge includes a filter cartridge body formed of polyfluorocarbon and having an inlet and an outlet. A polyfluorocarbon membrane assembly is disposed in the cartridge body so that fluid moving from the inlet to the outlet must pass through the membrane assembly. The membrane assembly includes a membrane of the type described above joined with a mesh support secured in the cartridge body so as to support the membrane against the pressure of fluid flow through the cartridge body. Preferably the mesh support is formed of polyfluorocarbon filaments having a diameter in the range of from about 0.001 inches to about 0.03 inches and woven to 8 or more filaments per inch in both the machine and cross-machine directions.

For a further understanding of the invention and further objects, features and advantages thereof, reference may now be had to the following description taken in conjunction with the accompanying drawings.

DESCRIPTION OF PREFERRED EMBODIMENTS

Figure 1:
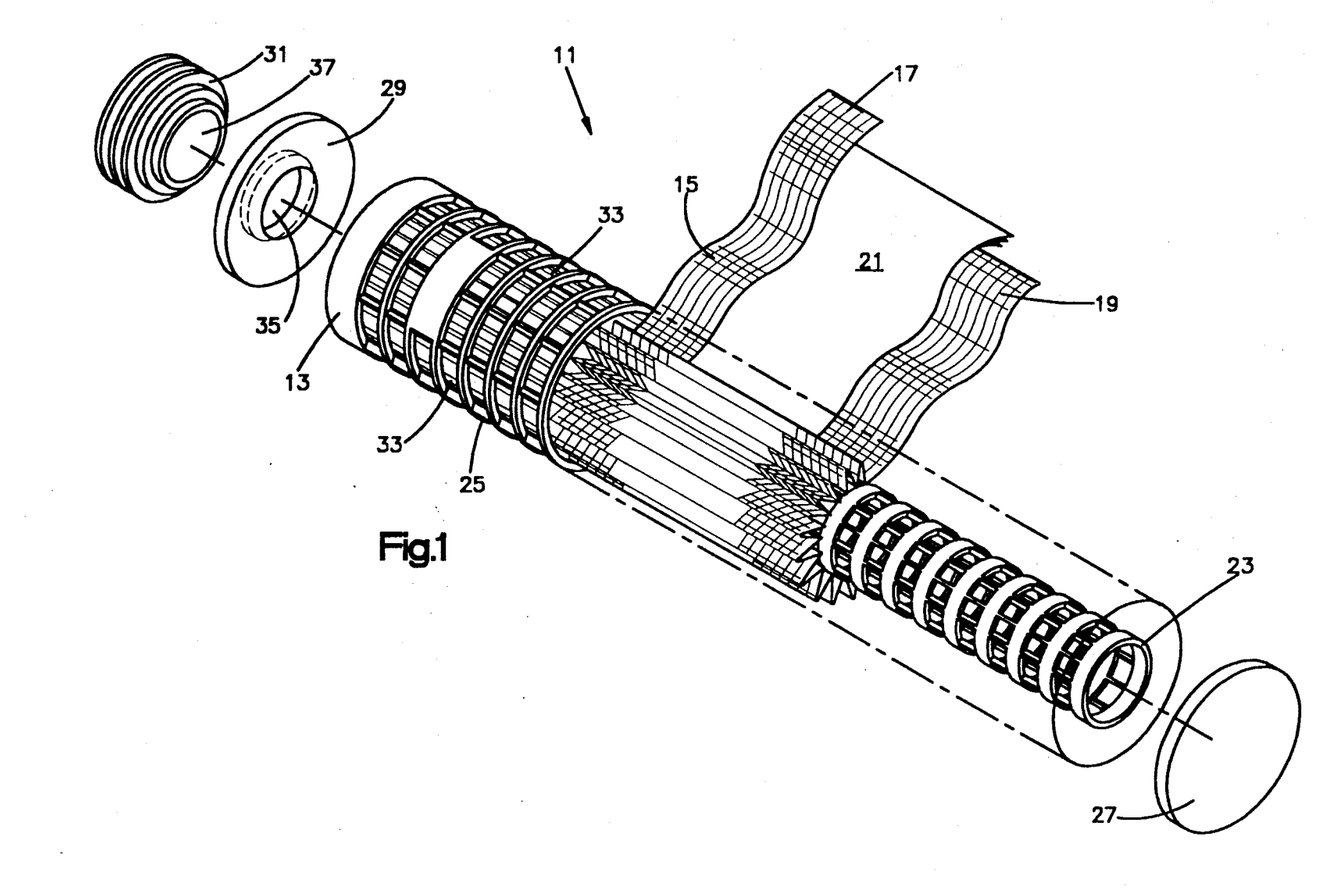
FIG. 1 is a perspective, exploded view of a microporous polyfluorocarbon filter cartridge constructed in accordance with the present invention.
Figure 2:
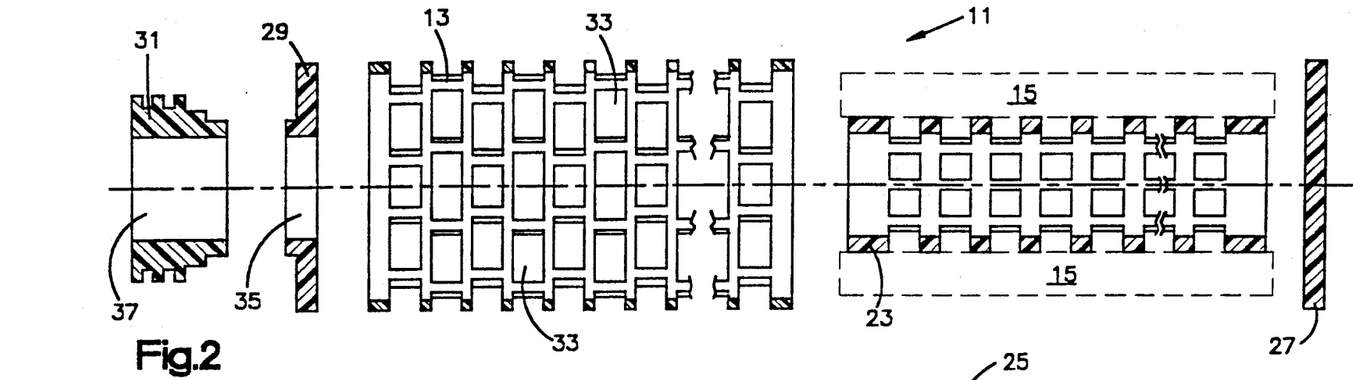
FIG. 2 is a longitudinal, exploded, cross-sectional view of the cartridge shown in FIG. 1.
Figure 3:
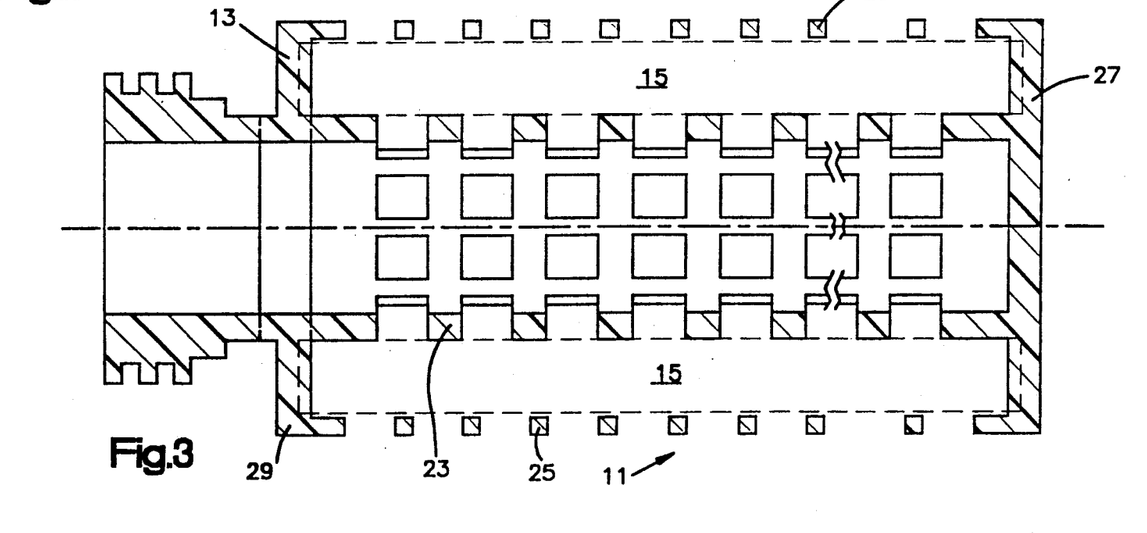
FIG. 3 is an assembled longitudinal cross-sectional view of the cartridge shown in FIG. 1.

Referring now to FIGS. 1 through 3, a microporous, polyfluorocarbon filter cartridge constructed in accordance with the present invention is shown generally at 11. The filter cartridge 11 includes a cartridge body 13 and a filter membrane assembly 15. The filter membrane assembly 15 includes an outer polyfluorocarbon mesh 17, an inner polyfluorocarbon mesh 19 and a composite, laminated, polyfluorocarbon microporous membrane 21 extending therebetween.

The cartridge body 13 is comprised of an inner cage 23, an outer cage 25, a distal end cap 27, a proximate end cap 29 and an end cap fitting 31. Each of these elements is constructed of a fluorocarbon polymer such as polytetrafluoroethylene (PTFE), fluorinated ethylenepropylene (FEP), polyfluoroalkoxy resin (PFA), polychlorotrifluoroethylene copolymer (PCTFE), ethylenechlorotrifluoroethylene copolymer (ECTFE), ethylenetetrafluoroethylene copolymer (ETFE), and polyvinylidene fluoride (PVDF). Most preferred among these is PFA since it is the most inert and withstands the highest temperature use while still being melt-processable.

Each of the cartridge body pieces 23 through 31 is melted together to form a single sealed cartridge body 13 using methods which are well known in the art. The filter membrane assembly 15 is formed into a cylindrical pleated shape and sealingly melted to the end caps 27 and 29 between inner cage 23 and outer cage 25.

A typical cartridge length for a cartridge of this type is from about 4 inches to about 10 inches. A typical cartridge diameter is from about 2 inches to about $3\frac{1}{2}$ inches. A typical filtration surface formed by the pleated, filter membrane assembly 15 is about 2 square feet for a 4 inch length cartridge and about 5 square feet for a 10 inch length cartridge.

The membrane assembly 15 must be sealingly connected to the end caps 27 and 29 so that fluid flowing through the cartridge must pass through the filter membrane 21. In a cartridge of the type described, it is typical that the inlet of the cartridge is the interstices or openings 33 of the outer cage 25. The outlet of the cartridge is a central opening 35 in the proximate end cap 29 and a central opening 37 in end cap fitting 31.

In use, a filter cartridge 11 is sealingly connected at its end cap fitting 31 inside a filter housing (not shown). Fluid to be filtered passes into the filter housing, through the inlet openings 33 of the cartridge 11 and exits the housing through outlet 37 of the cartridge 11.

Figure 7:
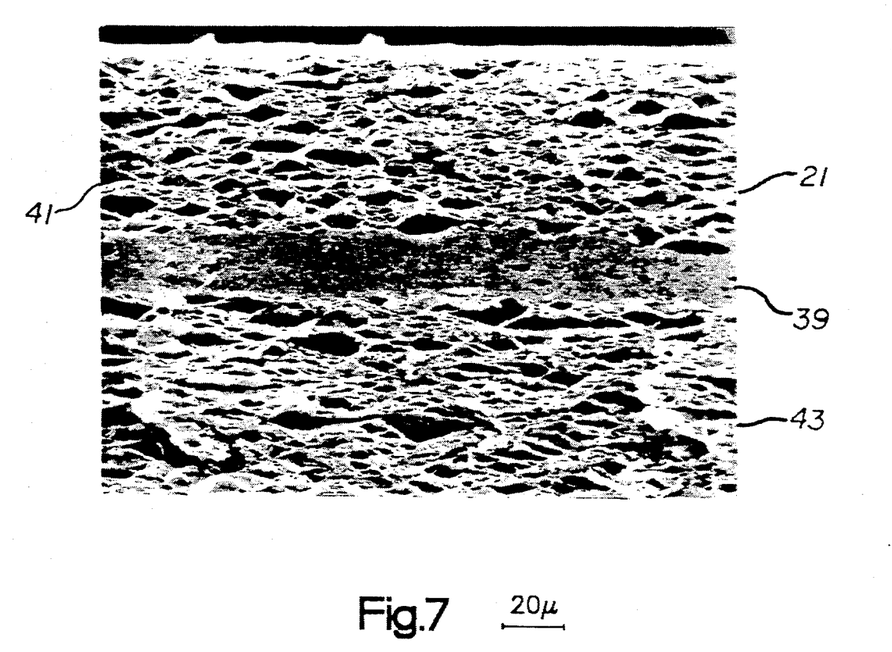
FIG. 7 is a cross-sectional view of a microporous polyfluorocarbon laminated membrane constructed in accordance with the present invention.
Figure 8:
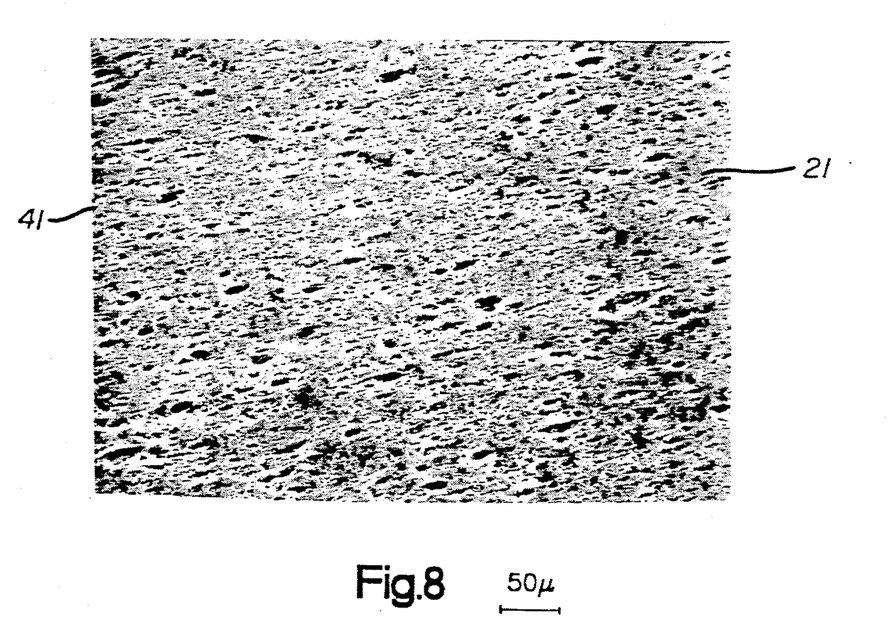
FIG. 8 is a side view of one side of the membrane shown in FIG. 7.
Figure 9:
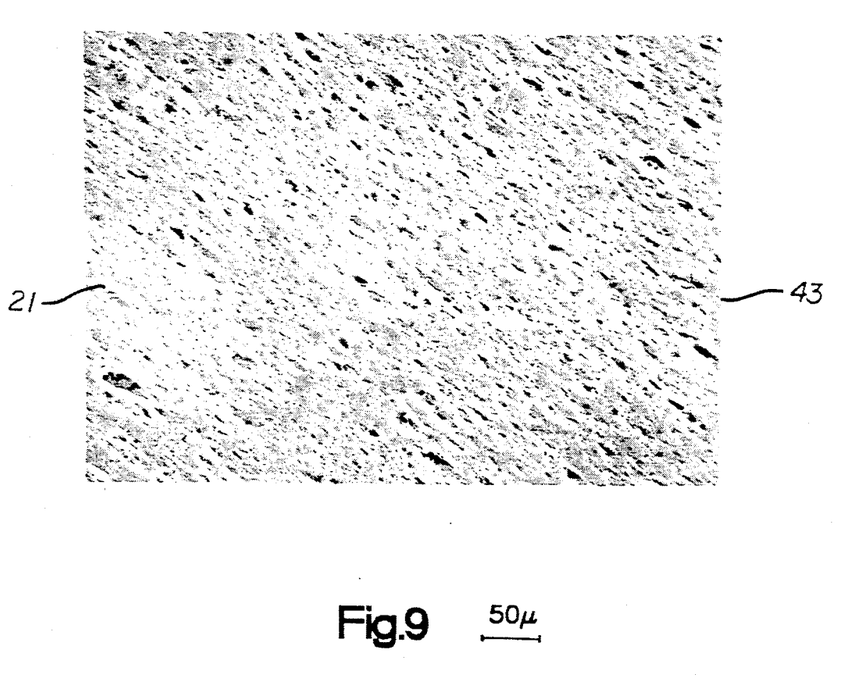
FIG. 9 is a side view of the opposite side of the membrane shown in FIG. 8.

Included among the fluorocarbon homopolymers and copolymers which can be used to make the novel laminated microporous polyfluorocarbon membranes 21 of this invention are polymers of fluoro (including perfluoro) and chlorofluoro lower alkenes containing 2 to 4 carbon atoms, inclusive, which can be otherwise unsubstituted or substituted with one or more non-interfering substituents, e.g., lower alkoxy groups. Such polymers include polytetrafluoroethylene, polytrifluoroethylene, tetrafluoroethylene/hexafluoroethylene copolymers, poly(fluoroethylene/ethylene) and poly(fluoroethylene/propylene) copolymers, polychlorotrifluoroethylene, poly(chlorotrifluoroethylene/ethylene) copolymers, polyfluoro-lower alkoxyethylenes, polyvinyl fluoride, polyvinylidene fluoride, and the like.

Any leachable or otherwise removable particulate, solid, pore forming filler whose average particle diameter falls within the aforementioned ranges can be employed in forming the membrane 21 of this invention. A number of types of removable fillers are disclosed in the above-listed prior art patents which relate to the first general method of preparing porous polyfluorocarbon membranes of films outlined above; see particularly U.S. Pat. No. 3,556,161 to Roberts at from column 2, line 28 to column 4, line 45. Particulate calcium carbonate is especially preferred when practicing this invention.

Methods of reducing removable fillers to the necessary fine particle size for use in forming the membrane 21 include both mechanical and chemical procedures, such as:

mechanical grinding using any of a number of types of grinders, e.g., an air impact pulverizer (jet mill), to produce fine powders; ordinarily the feed material being ground should have an average particle size of below about $50\mu m$ to obtain the best results;

using an aerosol generator, nebulizer or spray drier to produce small droplets of a solution of, e.g., an inorganic salt; evaporation of the solvent from these droplets generates small crystals or particles;

precipitation by adding a component that will react with the original solute in a solution to form an insoluble substance; for example, substantially uniform, very fine calcium carbonate particles can be obtained by adding a boiling solution of calcium chloride to a boiling solution of sodium carbonate;

salting out or recrystallization, in which the solubility of a solute in a solution is sharply reduced by adding a nonsolvent for the solute to the solution; for example, fine sodium chloride particles can be produced by adding methanol to an aqueous sodium chloride solution.

The last two of the above-listed particle size reduction methods require careful selection and control of process conditions—types and amounts of chemicals used, concentrations, temperature, pH, mixing rate, etc.—in ways well known to those skilled in the art, to produce pore forming filler particles whose average diameter falls within the aforementioned ranges. The crystalline particles obtained using these methods in a carefully controlled manner attain thermodynamic equilibrium with the solutions from which they are precipitated, recrystallized or salted out while they are very small, and stop growing at that point. Conventional crystal-growing processes produce crystals too large to be used in practicing this invention.

Polyfluorocarbon polymer powders are available commercially in the form of aggregates or agglomerates made up of sub-micron size spherical colloidal particles, i.e., particles having individual diameters within the aforementioned ranges—not more than about $0.3\mu m$, e.g., from about $0.1\mu m$ to about $0.3\mu m$, and preferably from about $0.1\mu m$ to about $0.2\mu m$. These aggregates or agglomerates typically have an average diameter of about $500\mu m$ or more, and must be broken up into discrete powder particles whose average diameters fall within the aforementioned ranges before being used in practicing this invention. The pore former can also form aggregates or agglomerates many times greater in size than the average diameter of the individual filler particles, and in such a case must also be broken up into discrete filler particles before use.

Such aggregates can be broken up in any convenient manner to give the requisite individual small particles. Thus, for example, a high shear homogenizer whose generator rotates at ultra high speed to create a cutting, ripping and demolishing action can be used for this purpose, together with a mixing liquid capable of wetting the surface of the particles and of later being removed by evaporation, extraction or any other convenient method at a temperature below the decomposition temperature of the fluorocarbon polymer. Such mixing liquids include hydrocarbon oils such as kerosene, solvent naphtha, white oil and Isopar H hydrocarbon oil (Exxon Chemical Co.), aromatic hydrocarbons such as toluene and xylene, alcohols, ketones, esters, silicone oils, fluorocarbon oils, organic fluorosurfactants, e.g., Zonyl® FSN fluoroalkyl poly(ethyleneoxy)ethanol nonionic surfactant (duPont), and polymers such as polyisobutylene or polyisoprene, unsaturated monomers, or monomer-polymer syrups in solution in one of the above-mentioned hydrocarbon oils, aromatic hydrocarbons, alcohols or ketones, as well as mixtures of these mixing liquids. The mass ratio of mixing liquid to solid can range from about 2:1 to about 50:1, and preferably from about 6:1 to about 8:1. The mixing liquid also serves as a lubricant for the fluorocarbon polymer particles during subsequent processing.

Operating the high shear homogenizer at about 20,000 rpm for about 3-5 minutes has been found adequate to break up polyfluorocarbon polymer and pore forming filler aggregates and give a slurry of fine powder particles in the mixing liquid. Longer or shorter times at higher or lower speeds can, of course, be used where necessary.

The amount of pore forming filler employed in admixture with powdered fluorocarbon polymer can range from about 60% to about 90% by weight, based on the total weight of these two materials. Preferably, the amount of pore forming filler used will range from about 75% to about 85% by weight, on the same basis, to give optimum combinations of flux, retention and strength in the finished asymmetric membranes.

The method used to prepare individual sheets or films from mixtures of the above-described powdered fluorocarbon polymers and pore forming fillers can be, as indicated above, any method known in the art for this purpose.

One such method involves first forming a slurry of fine powder particles of the fluorocarbon polymer and pore forming filler in a mixing liquid, then filtering this slurry to remove the majority of the mixing liquid, e.g., all but from about 10% to about 25%, and preferably from about 15% to about 20%, of this liquid, and obtain a wetted filter cake.

This filter cake can then be treated in any convenient fashion, e.g., it can be pressed (molded) or paste extruded (using, e.g., an extruder with a reduction ratio below about 50:1), to make a preform whose thickness, although not critical, will usually range from about 0.03 to about 0.25 inch, and preferably from about 0.03 to about 0.10 inch.

The preform is fed to the nip of a pair of calender rolls set to reduce the preform's thickness to from about 10 to about 25 mils, and preferably from about 10 to about 15 mils. The resulting sheet is usually folded over upon itself and calendered again. Calendering, folding, and, if desired, turning the folded sheet to a certain extent, e.g., through 45-90 degrees before recalendering, can be repeated from 2 to 10 times or more to increase uniformity in the thus-formed sheet or film. The nip of the calender rolls is then adjusted downwardly, usually to below about 3 mil, and the sheet or film is calendered under a pressure of from about 200 to about 3000 lb., with the calender rolls heated to permit a temperature of from about 100-130 degrees F. to be maintained, to a thickness which will generally range from about 2 to about 8 mils.

Sheets or films whose average pore diameter, once the pore forming filler is removed, ranges from about $0.01\mu m$ to about $10\mu m$, and preferably from about $0.1\mu m$ to about $5\mu m$, will be fabricated as precursors of the novel microporous asymmetric membranes of this invention.

Three or more, e.g., up to as many as nine, of the thus prepared calendered sheets or films made from the same or different fluorocarbon polymers, each containing sufficient mixing liquid (lubricant) to facilitate binding and lamination of the sheets or films to each other, and a pore forming filler of different average particle diameter from the filler used in the others, are then laid up together, with a small pore former-containing sheet or film in the center and progressively larger pore former-containing sheet(s) or film(s) laid on either side of it, to form a sandwich composite of such sheets or films. The sheets or films can be laid up with each sheet stacked in the direction in which it was last calendered, or with each succeeding sheet or film stacked at any angle, e.g., 45 degrees or 90 degrees, to the proceeding sheet(s) or film(s). The composite stack of sheets or films is then laminated into an integral composite membrane by application of heat and pressure, e.g., using heated calender rolls, and can also be dried, i.e., have the mixing liquid (lubricant) driven off, during lamination. The amount of mixing liquid (lubricant) in the sheets or films prior to lamination should be between about 5% and about 50% by weight, and preferably between about 10% and about 15% by weight, of the total weight of the stack of sheets. The laminating pressure should be between about 100 psi and about 10,000 psi, and preferably from about 1,000 psi to about 3,000 psi, with temperatures of from about 70 degrees F. to about 250 degrees F. and preferably from about 100 degrees F. to about 115 degrees F., being employed during lamination.

These laminating conditions will be correlated to provide membranes which, once they have been sintered and the pore formers removed, will have a fine or small pore sheet sandwiched between a first sheet or sheets of larger porosity and a second sheet or sheets of larger porosity. This lamination arrangement allows a desirably thin small pore sheet 39 to be achieved. The fine pore sheet 39 is protected by the larger porosity sheets 41 and 43. In addition, the upstream larger porosity sheet or sheets 41 can serve as a prefilter to large particle contaminants in the fluid filtered.

Preferably the small pore sheet 39, after lamination, has a thickness in the range of from about $3\mu m$ to about $50\mu m$, more preferably in the range of about $5\mu m$ to about $15\mu m$, and most preferably about $10\mu m$. Preferably the larger porosity sheets 41 and 43 have a thickness in the range of about 0.001 inches to about 0.005 inches. The resulting composite, laminated membrane preferably has a thickness in the range of about 0.002 inches to about 0.010 inches.

The resulting laminated member 21 will exhibit high porosity, high strength, high flux, low particle shedding and superior dirt holding capacity. Such membranes will have average pore diameters on their small pore sheets 39 ranging from about $0.0\mu m$ to about $1.0\mu m$, and preferably from about $0.1\mu m$ to about $0.5\mu m$, and average pore diameters on their large pore sheets 41 and 43 ranging from about $1\mu m$ to about $10\mu m$, and preferably from about $2\mu m$ to about $5\mu m$.

If the films in the stack before lamination are too dry, i.e., if they contain an inadequate amount of lubricant, or if the laminating temperatures and pressures employed are not high enough, the individual sheets or films will not bind together. If, on the other hand, the temperatures and pressures employed are too high, the pore forming filler particles in each sheet or film will be mixed together with those in adjacent sheets or films, and the fine pore structure of the sandwiched fine pore sheet will not be achieved. Correlation of these conditions, however, is well within the skill of the art and can easily be accomplished by examining photomicrographs of cross-sections of microporous asymmetric membranes whose pore former-containing precursors were formed under particular conditions of temperature, pressure and lubricant content; see, e.g., FIG. 7 to determine fine pore structure and fine pore membrane thickness, and by measuring the performance characteristics of such microporous membranes.

The thus-obtained precursor membranes can then be oven-dried to remove any remaining lubricant, sintered (in a separate step, or simply by increasing the temperature in the laminating step or in the drying oven, or by sintering the membranes directly without passing through a drying stage), and then contacted with a material which will dissolve out the pore forming filler, heated to remove the filler, etc., each of these steps also being conducted in conventional fashion. Thus, for example, drying to drive off any remaining lubricant can be carried out at temperatures ranging from about 140 degrees C. to about 195 degrees C., and preferably at from about 145 degrees C., and sintering can be effected at temperatures ranging from about 335 degrees C. to about 360 degrees C., and preferably at 340 degrees C. to about 345 degrees C.

The preferred pore forming filler, calcium carbonate, can be leached from the sintered precursor membrane by treatment with aqueous acid, e.g., hydrochloric acid. Sodium chloride, if used as the pore former, can be removed simply by immersing the precursor membrane in hot water.

Figure 4:
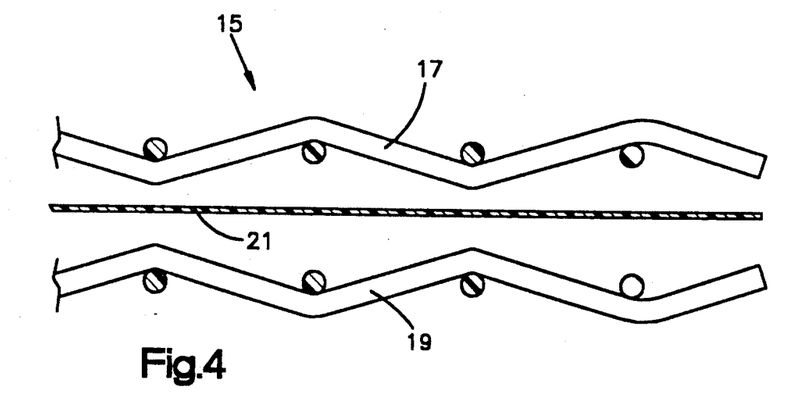
FIG. 4 is an exploded cross-sectional view of a membrane assembly constructed in accordance with the present invention.
Figure 5:
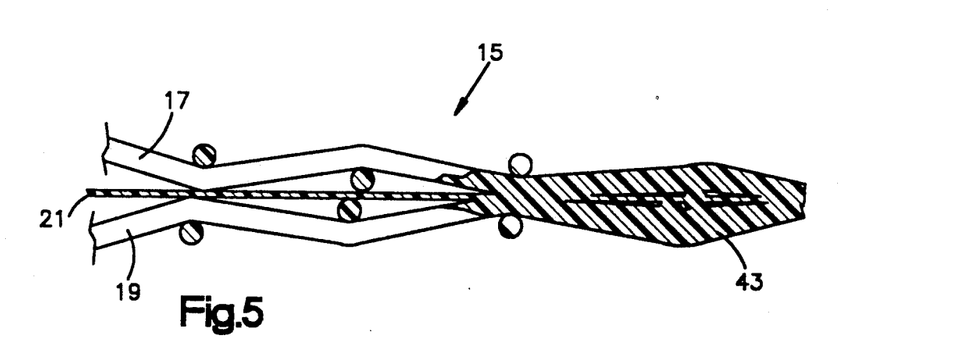
FIG. 5 is an assembled cross-sectional view of the membrane assembly shown in FIG. 4.

The novel microporous asymmetric polyfluorocarbon membranes of this invention, by virtue of the low resistance to fluid flow provided by their very thin control section (the layer or layers of the membrane having the smallest average pore diameters), exhibit higher flux than do conventional stretched porous polyfluorocarbon membranes or films having polymer nodes interconnected by fibrils. They also provide higher flux than membranes which expose the control membrane since this exposure requires the control membrane to be thicker reducing its flux. For example, a membrane which exposes its control membrane to the pressure of mesh such as mesh 17 or 19 must be at least 75μm thick to prevent it from tearing. This thickness would decrease the flux by a factor of 10.

While the larger pores found in the other layers of our novel composite membranes offer still lower resistance to fluid flow, these other layers provide strength to the composite structure and, when positioned upstream of the control section, operate as a prefilter to remove contaminants which otherwise could plug the control section. Serial filtration accomplished in this fashion prolongs the useful life of the control section, and thus increases both the dirt holding capacity and the throughput of the filtration medium.

It has been found that larger pore membranes positioned downstream of the fine membrane provide still further strength without causing any loss of integrity of the fine pore membrane during the lamination process or thereafter. In fact, it has been found that this protective downstream membrane allows the fine membrane to be made even thinner in its laminated state. Thus, this form of sandwich laminated membrane results in a polyfluorocarbon, microporous filter membrane which is both stronger and has greater flux.

After forming as described, the composite, laminated member 21 is placed between inner support mesh 19 and outer support mesh 17. The mesh 17 and 19 are formed of polyfluorocarbon filaments. In order for the filaments to have sufficient strength while providing a cushioning support to the membrane, the filaments must have a diameter in the range of from about 0.001 inches to about 0.03 inches. The filaments are woven to a density of more than 8 filaments per inch in both the machine and cross machine directions. Most preferably the filaments are about 0.01 inches in diameter and have a density of about 20 by 20.

With the mesh 17 and 19 and membrane assembled on opposite sides of the membrane 21, the assembly 15 can be pleated and the longitudinal edges of the pleats melted together to form a pleated cylinder. This cylinder is then melt-joined at its longitudinal ends to the end caps 27 and 29 as the inner cage 23 and outer case 25 are also melt-joined thereto. If desired, the end edges of the pleated cylinder can be premelted to form a single edge of the mesh and membrane.

Figure 6:
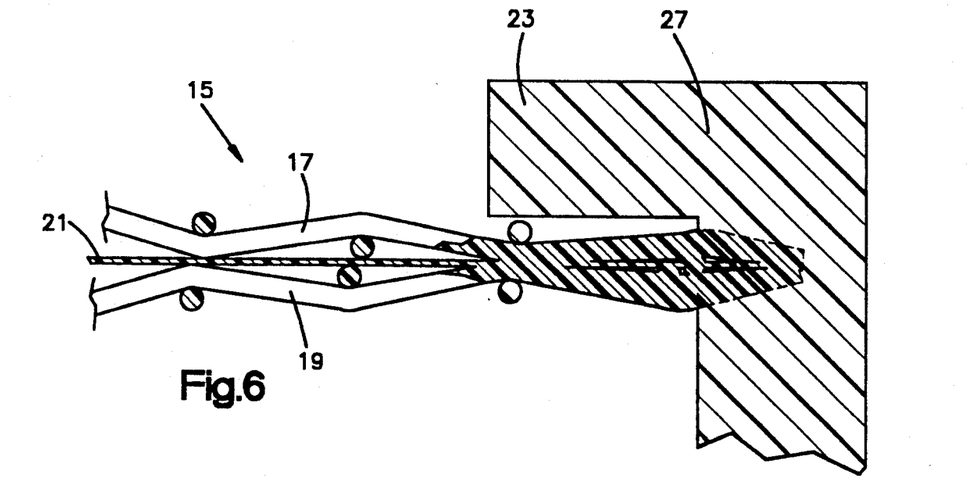
FIG. 6 is a cross-sectional view of the membrane assembly shown in FIG. 5 attached to an end of the cartridge shown in FIG. 3.

It is necessary to be sure that the end edges of the membrane 21 are sealed to the end caps 27 and 29 along the entire pleated cylinder ends. Without this seal a leak path is formed which bypasses the membrane and destroys the function of the filter cartridge.

The resulting membrane and cartridge constructed as described are formed entirely of polyfluorocarbon and have high flux and strength.

EXAMPLE 1

Two separate slurries were prepared as follows:
Slurry 1: 14000g of 0.07μm dia. CaCO$_3$, 3500g of 0.2μm dia. PTFE, and 25000g Isopar H hydrocarbon oil blended for 5 minutes in high shear homogenizer at 8000 rpm.

Slurry 2: 24000g of 3.0μm dia. CaCO$_3$, 8000g of 0.2μm dia. PTFE, and 22500g Isopar H blended for 5 minutes in high shear homogenizer at 3000 rpm.

Each of these slurries was then separately filtered in a plate and frame filter press to yield filter cake of 20% by weight Isopar H. Each set of filter cakes was then broken up and pressed into cylindrical preforms 3 inches in diameter X 9 inches long. The two sets of preforms were then separately fed to a Ram extruder and extruded, yielding preform extruded of circular cross-section, 0.625 inches diameter. Each extruded was cut to 24 inches lengths, and these lengths were fed to a pair of calender rolls, nip gap 0.25 inches. The resulting sheet was folded on itself, rotated 90 degrees, and refed to the 0.25 inches calender nip. This step was repeated five times for each extruded set. After the fifth pass, the resultant sheet was rotated 90 degrees, but not folded, and fed to calender nip set at 0.050 inches. The resulting sheets were trimmed to 13.5 inches x 8 inch rectangles. The resulting rectangles were fed to a calender nip as follows:

Stack from slurry 1 - 0.010 inches nip gap
Stack from slurry 2 - 0.020 inches nip gap The result is two separate sets of PTFE rectangles. Two of the rectangles from slurry 2 are then placed on opposite sides of a rectangle from slurry 1 to form a sandwich about the sheet from slurry 1. This sandwich of sheets is fed to a calender nip as follows:

Nip gap set at 0.006 inches. Calender rolls are heated to 170 degrees F.

The resultant composite, rectangular sheet containing three distinct but integral layers is then dried at 300 degrees F. in an infrared conveyor oven operating at 40 in./min., and subsequently sintered in the same oven at 650 degrees F and 40 in./min. The sintered rectangular sheet is then immersed for 40 minutes in an aqueous solution of 1.0 M HCl, containing 30 percent MEOH to leach out the CaCO$_3$ pore former. The sheet is then rinsed with water and dried. The resultant symmetric PTFE membrane is shown cross-section in FIG. 1. Flux for this membrane is 0.8 ml/min/cm$^2$/psi in methanol. Polystyrene latex retention (0.142μm) is 99.5 percent. IPA bubble point is 25 psig. and tensile strength is 8.2 lb/in in the machine direction and 3.0 lb/in in the cross machine direction. A microporous, integral, composite polyfluorocarbon membrane suitable for use as a filter membrane is thus obtained.

EXAMPLE 2

Identical to Example 1, except as follows:
Slurry 1: 14000g of 0.75μm dia. CaCO$_3$, 3500g of 0.2μm dia. PTFE and 25000g Isopar H.
Slurry 2: 24000g of 7.0μm dia. CaCO$_3$, 8000g of 0.2μm dia. PTFE, and 225000g Isopar H.

The resultant membrane has a flux of 1.6 ml/min/cm$^2$/psi in methanol. Polystyrene latex retention (0.212μm) is 75 percent. IPA bubble point is 15 psig. and tensile strength is 10.3 lb/in in the machine direction and 4.2 lb/in in the cross machine direction. A microporous, integral, composite polyfluorocarbon membrane suitable for use as a filter membrane is thus obtained.

EXAMPLE 2

A pleated pack comprised of a PTFE membrane formed according to Example 2, plus an outer layer of support or mesh on each surface, is sealed longitudinally to itself at the ends of the pack. This pack is then placed around a PFA filter core so that pleats protrude radially from the center. A PFA filter cage (2.5 inches O.D. and 8 inches length) is slipped over these components resulting in a pack subassembly. The ends of this subassembly must be sealed to afford an integral filter element. This is accomplished by end capping as follows:

An annular disc of molded PFA Teflon (2.5 inches O.D. x 0.25 inches thick x 1.2 inches I.D.) is placed in a stainless steel well, cavity being of the outside dimensions of the disc. This well is jacketed with cooling water, independently controlled. A two sided ceramic heating element (800 W, 1200 degrees F maximum surface temperature) is indexed directly over the top surface of the PFA disc in the well. The heating element output is variably controlled with a variac. Distance between top surface of PFA disc and bottom surface of heating element is 0.25 inches +/−0.125 inches. At the same time, one end of the pack subassembly is indexed over the opposite surface of the two sided heating element. Distance between heater surface and end of pack subassembly is 1 inch +/−0.5 inches. The annular disc and the end of the pack subassembly are heated in this manner until the surface of the disc becomes molten, as determined by experiment. (120 sec. at 90% heater output are sample heating conditions to make the disc appropriately molten.) When this state is achieved, the heater element is removed from between the two components and the end of the pack subassembly is simultaneously forced and embedded into the molten disc surface. (55 lb-force) The two components are held together in this manner for a period sufficient to allow the end cap disc to cool and solidify, thus integrally sealing the end of the filter element pleats. Water flow to the disc cooling jacket is applied at this time to facilitate cooling. (300 sec. at 1.5 gpm water flow, 55 degrees F. water.)

The opposite end of the filter pack is sealed using the above procedure. Subsequently, one end of the completed element is fitted with a fusion welded PFA plug in a manner similar to end capping above. The opposite end is fitted with various PFA adaptor fittings to allow installation into a range of commercially available filter housings.

The resulting filter cartridge has a flux of 1.8 gpm/psi in water. Polystyrene latex retention (0.212μm) is 75 percent. IPA bubble point is 12 psig and the maximum pressure drop in the forward flow direction is 40 psig. The maximum use temperature is 150 degrees C. A microporous polyfluorocarbon filter cartridge is thus obtained. In contrast, a cartridge constructed using a single layer membrane with retention and bubble point equal to Example 2 would have a water flux of 0.6 gpm/psi.

The above discussion of this invention is directed primarily to preferred embodiments and practices thereof. It will be readily apparent to those skilled in the art that further changes and modifications in the actual implementation of the concepts described herein can be made without departing from the spirit and scope of the invention as defined by the following claims.

What is claimed is:

1. A microporous, integral, composite polyfluorocarbon membrane made up of three or more sheets of aggregated microporous fluorocarbon polymer, said polymer having in the unaggregated state an average individual particle diameter of not more than about 0.3μm, said membrane having a fine porosity pore-containing microporous fluorocarbon polymer sheet having an average pore diameter of from about 0.01μm to about 1μm integrally formed between a first sheet or sheets of larger porosity microporous fluorocarbon polymer and a second sheet or sheets of larger porosity microporous fluorocarbon polymer, at least one of said first and second sheets having an average pore diameter of from about 1μm to about 10μm.

2. The membrane of claim 1 wherein each of said first and second sheets has an average pore diameter in the range of from about 1μm to about 10μm.

3. The membrane of claim 2 wherein each of said first and second sheets has a thickness in the range of from about 0.001 inches to about 0.005 inches.

4. The membrane of claim 3 wherein said fine porosity sheet has a thickness in the range of from about 3μm to about 50μm.

5. The membrane of claim 4 wherein said fine porosity sheet has a thickness in the range of from about 5μm to about 15μm.

6. A microporous polyfluorocarbon filter cartridge comprising:
a filter cartridge body formed of polyfluorocarbon and having an inlet and an outlet,
a polyfluorocarbon filter membrane assembly disposed in said cartridge body so that fluid moving from said inlet to said outlet must pass therethrough, said membrane assembly having:
a microporous, integral, composite polyfluorocarbon membrane made up of three or more sheets of aggregated microporous fluorocarbon polymer, said polymer having in the unaggregated state an average individual particle diameter of not more than about 0.3μm, said membrane having a fine porosity pore-containing microporous fluorocarbon polymer sheet having an average pore diameter of from about 0.01μm to about 1μm integrally formed between a first sheet or sheets of larger porosity microporous fluorocarbon polymer and a second sheet or sheets of larger porosity microporous fluorocarbon polymer, at least one of said first and second sheets having an average pore diameter of from about 1μm to about 10μm and,
a polyfluorocarbon mesh support secured in said cartridge body so as to support said membrane against the pressure of fluid flow through said cartridge body.

7. The membrane of claim 6 wherein each of said first and second sheets has an average pore diameter in the range of from about 1μm to about 10μm.

8. The membrane of claim 7 wherein each of said first and second sheets has a thickness in the range of from about 0.001 inches to about 0.005 inches.

9. The membrane of claim 8 wherein said fine porosity sheet has a thickness in the range of from about 5μm to about 50μm.

10. The membrane of claim 9 wherein said fine porosity sheet has a thickness in the range of from about 5μm to about 15μm.

* * * * *